United States Patent [19]

Kilian

[11] Patent Number: 5,524,031

[45] Date of Patent: Jun. 4, 1996

[54] ATTACHABLE DEBRIS FILTER FOR BWR NUCLEAR FUEL ASSEMBLIES

[75] Inventor: Douglas C. Kilian, Richland, Wash.

[73] Assignee: Siemens Power Corporation, Wash.

[21] Appl. No.: 349,101

[22] Filed: Dec. 2, 1994

Related U.S. Application Data

[62] Division of Ser. No. 268,398, Jun. 30, 1994.

[51] Int. Cl.⁶ .................................................. G21C 3/322
[52] U.S. Cl. ........................... 376/261; 376/313; 376/352
[58] Field of Search ..................................... 376/260, 261, 376/313, 352, 443, 446

[56] References Cited

U.S. PATENT DOCUMENTS 5,030,412  7/1991  Yates et al. ............................... 376/352
5,384,814  1/1995  Matzner et al. .......................... 376/352

*Primary Examiner*—Daniel D. Wasil
*Attorney, Agent, or Firm*—Ira Lee Zebrak

[57] ABSTRACT

A method for retrofitting an irradiated nuclear fuel assembly including removing a portion of the inlet nozzle and installing a debris filter.

3 Claims, 7 Drawing Sheets

FIG. 6A
FIG. 6B
FIG. 6C
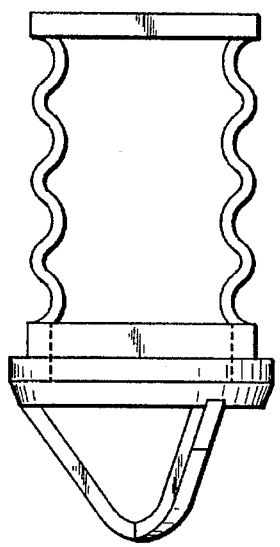
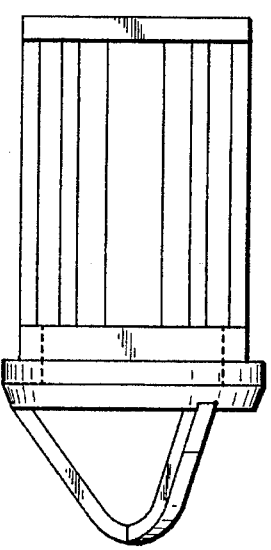
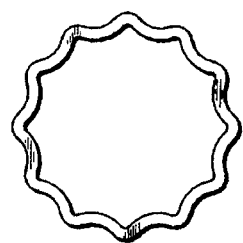
FIG. 7A
FIG. 7B
FIG. 7C
FIG. 7D

ATTACHABLE DEBRIS FILTER FOR BWR NUCLEAR FUEL ASSEMBLIES

This is a divisional application of U.S. patent application Ser. No. 08/268,398 filed Jun. 30, 1994.

FIELD OF THE INVENTION

The present invention is directed to debris filters for nuclear reactor fuel and more particularly to attachable debris filters for Boiling Water Reactor (BWR) nuclear fuel assemblies.

BACKGROUND

As a result of experience with long term operation and multiple reloads of nuclear fuel elements, it has been found that certain operating conditions arise which tend to reduce energy output per unit of fuel obtainable and thereby affect operating costs and efficiencies in an undesirable manner.

One of the problems in connection with the operation of nuclear reactors is the accumulation of debris of various sizes, which may occur during original construction, subsequent operation or during repair and may include nuts, bolts, metal turnings, shavings, wires, drill bits, electrical connectors, and various kinds of trash. During the operation of nuclear reactors, the metal debris which may be present in the nuclear reactor can be carried by the cooling water and can impact upon fuel assembly components. The repeated interaction of such debris and fuel assembly components can result in fretting damage to the components. Certain sizes of this type of debris are particularly troublesome, since that debris is likely to be carried by cooling water to the area near the bottom (lower ends) of the fuel rods. Some of the debris can be caught between the fuel rods and other fuel assembly components. The debris vibrates in the moving coolant and impacts principally upon the lower end of the fuel rods, ultimately abrading and causing fretting wear of the fuel rod cladding at that point. This type of wear is recognized as a significant cause of fuel failures or the escape of fuel and fission products leading to the premature withdrawal from service of the fuel assembly.

Attempts have been made in the past to mitigate the affect of such debris on the fuel rods by incorporating integral filters or integral filter mechanisms into the design and manufacture of new fuel assemblies containing unirradiated nuclear fuel. Such attempts to mitigate the debris problem in unirradiated or new fuel assemblies may unacceptably increase the pressure drop through the fuel assembly and can result in a lower coolant flow and, therefore, lowered permissible power level. However, the problem of protecting irradiated nuclear fuel rods in a nuclear fuel assembly has been more problematic and costly due to pressure drop considerations as well as the difficulty of modifying the assembly, remotely, and in a radioactive environment.

OBJECTS OF THE INVENTION

It is an object of the present invention to provide a debris filter for irradiated nuclear fuel assemblies which attaches to the irradiated fuel assembly to filter out debris from the coolant prior to entering the fuel assembly.

It is another object of the invention to provide a debris filter that is removable, reusable and interchangeable from one fuel assembly to another.

It is yet another object of the invention to provide a debris filter having a filter area larger than the area of the inlet nozzle orifice of the fuel assembly and which has a relatively low pressure drop.

It is yet a further object of the invention to provide a procedure to install a removable, reusable, replaceable and interchangeable debris filter in an irradiated fuel assembly by removing a portion of the inlet nozzle containing the three pronged guide and where the debris filter includes a portion to replace the removed inlet nozzle and three pronged guide.

SUMMARY OF THE INVENTION

These and other objects of the invention are achieved by providing a method for retrofitting an irradiated nuclear fuel assembly in bottom entry fuel assembly type nuclear reactors, the fuel assembly having an inlet nozzle comprising a fuel assembly inlet with an orifice and a multi-pronged guide, the method comprising the steps of (a) removing at least a portion of the multi-pronged guide of the fuel assembly inlet nozzle; (b) installing a debris filter within the fuel assembly inlet through the inlet orifice.

Further objects of the invention are achieved by providing a debris filter for filtering out debris from reactor coolant water for installation within a modified irradiated nuclear fuel assembly and disposed through the inlet orifice and supported by the inlet nozzle, the debris filter comprising a cap ring adapted to form a coolant entrance orifice, the cap ring having a first side from which extends a multi-pronged guide, the cap ring having a second side from which extends a support ring for aligning the debris filter within the fuel assembly, the debris filter further including a filter media for filtering out debris from reactor coolant water, the filter media being secured to the support ring.

BRIEF DESCRIPTION OF THE DRAWINGS

FIG. 6A illustrates a cross-sectional view of another embodiment of the present invention;

FIGS. 6B and C illustrates a cross-sectional and top view of another embodiment of the present invention;

FIGS. 7A, 7B, 7C, and 7D illustrate cross-sectional views of examples of louvered blade filter media of the present invention;

DETAILED DESCRIPTION

Figure 1:
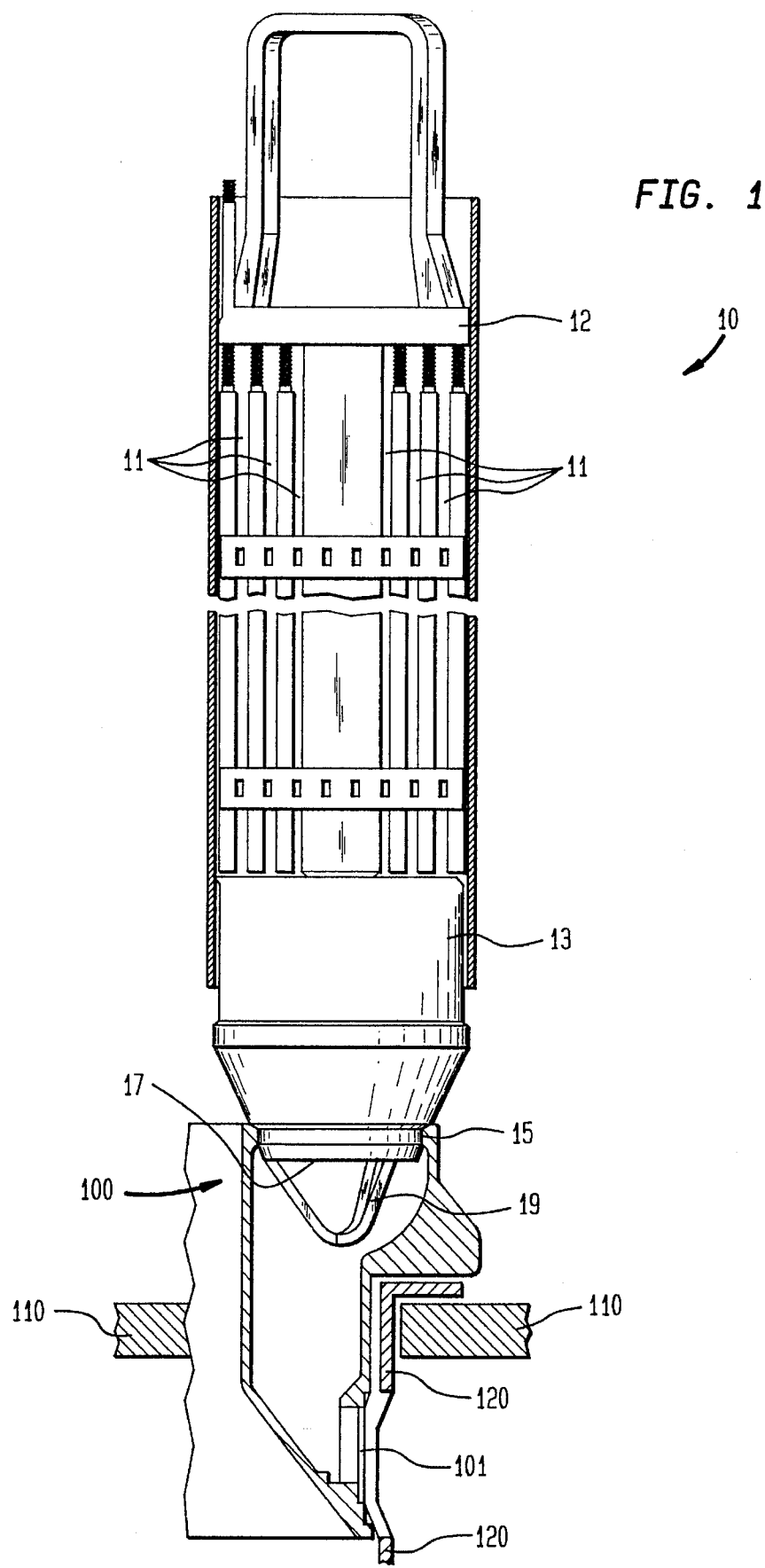
FIG. 1 is a cross-sectional view of a typical boiling water nuclear fuel assembly having an inlet nozzle in accordance with the prior art.
Figure 2:
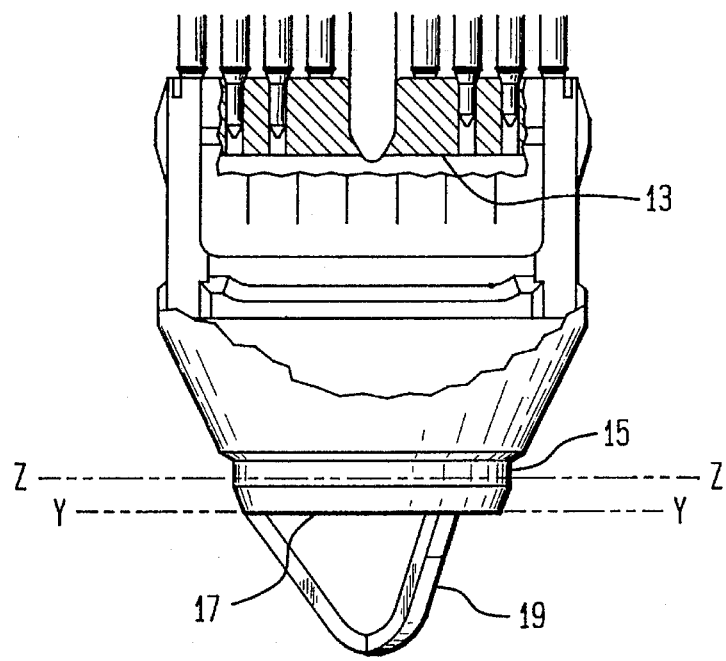
FIG. 2 is an enlarged view of the lower portion of the fuel assembly of FIG. 1.
Figure 3:
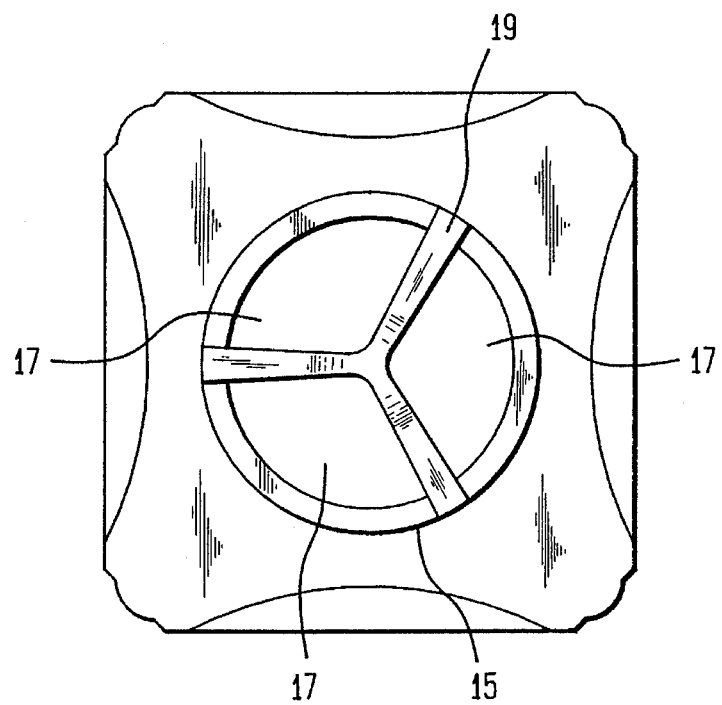
FIG. 3 is a bottom view looking up at the lower portion of the fuel assembly shown in FIG. 2.

Referring to FIG. 1, a bottom entry nuclear fuel assembly 10 typical of boiling water reactors is shown. The assembly includes a number of nuclear fuel rods 11 disposed between an upper tie plate 12 and a lower tie plate 13. Inlet nozzle 15 contains an orifice 17 which is surrounded by a three pronged guide 19. Each fuel assembly rests on a fuel assembly support plate 100 having an orifice 101 for the inlet of coolant water to the fuel assembly. Fuel assembly support plate 100 is located laterally by core support plate 110 and supported vertically by control rod guide tube 120. When the fuel assembly is within the core and located in its proper location within the fuel assembly support plate, three pronged guide 19 of the fuel assembly is located within assembly support plate 100. FIG. 2 is an enlarged view of the lower portion of the fuel assembly 10 shown in FIG. 1. FIG. 3 is a bottom view of the fuel assembly 10 showing three pronged guide 19, inlet nozzle 15 and inlet orifice 17.

The following described embodiments discuss various debris filters as well as the method of modifying the fuel assembly and attaching a debris filter to an irradiated boiling water reactor nuclear fuel assembly to trap debris carried by the coolant.

Figure 4A:
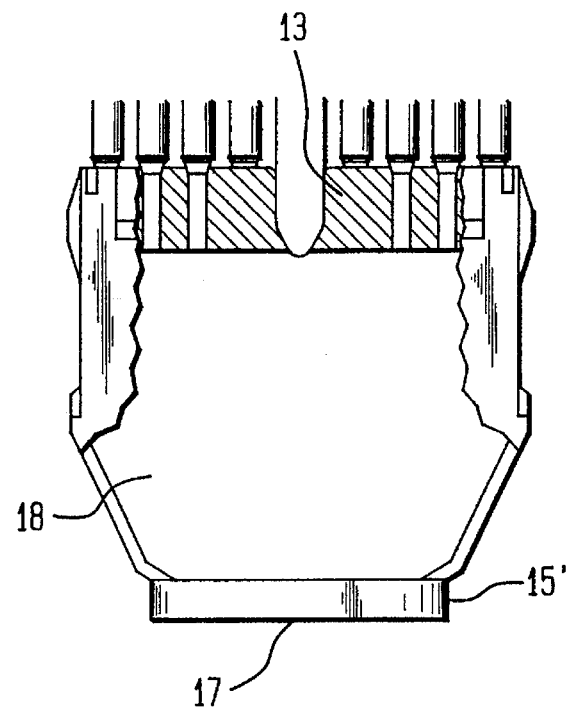
FIG. 4A illustrates an enlarged view of the lower portion of the fuel assembly of FIG. 1 following cutting away of a portion of the lower nozzle and the three pronged guide.
Figure 4B:
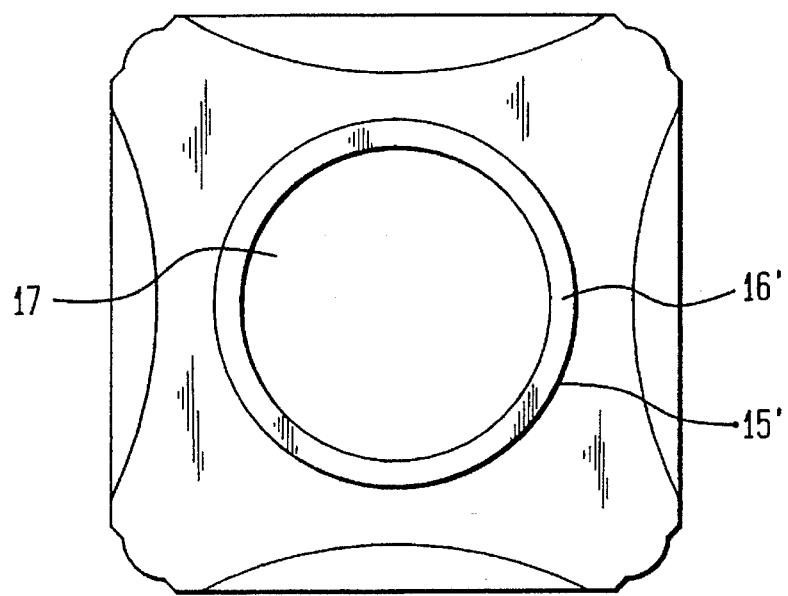
FIG. 4B is a bottom view looking up at the lower portion of the fuel assembly shown in FIG. 4.

Referring to FIGS. 4A and 4B, the fuel assembly initially has a portion of the inlet nozzle and the three pronged guide shown in FIGS. 1–3 removed by cutting the inlet nozzle along cut line Z—Z shown in FIG. 2. Cutting the inlet nozzle to remove the three pronged guide enables the inlet nozzle to receive a removable, reusable and interchangeable debris filter of appropriate design. Cutting is accomplished with typical tools such as underwater saws or electrodischarge machining available to those skilled in nuclear fuel assembly repair. The resulting modified inlet nozzle 15' is slightly shorter than that of inlet nozzle 15. Although inlet nozzle 15 is shown cut along line Z—Z for purposes of illustration, it is readily understood that the lower nozzle 15 can be cut at any other location to remove the three pronged guide leaving the lower nozzle otherwise intact. Thus, in an alternative embodiment, the three prong guide is removed by cutting each of the three prongs flush with the nozzle at cut line Y—Y shown in FIG. 2.

Figure 5:
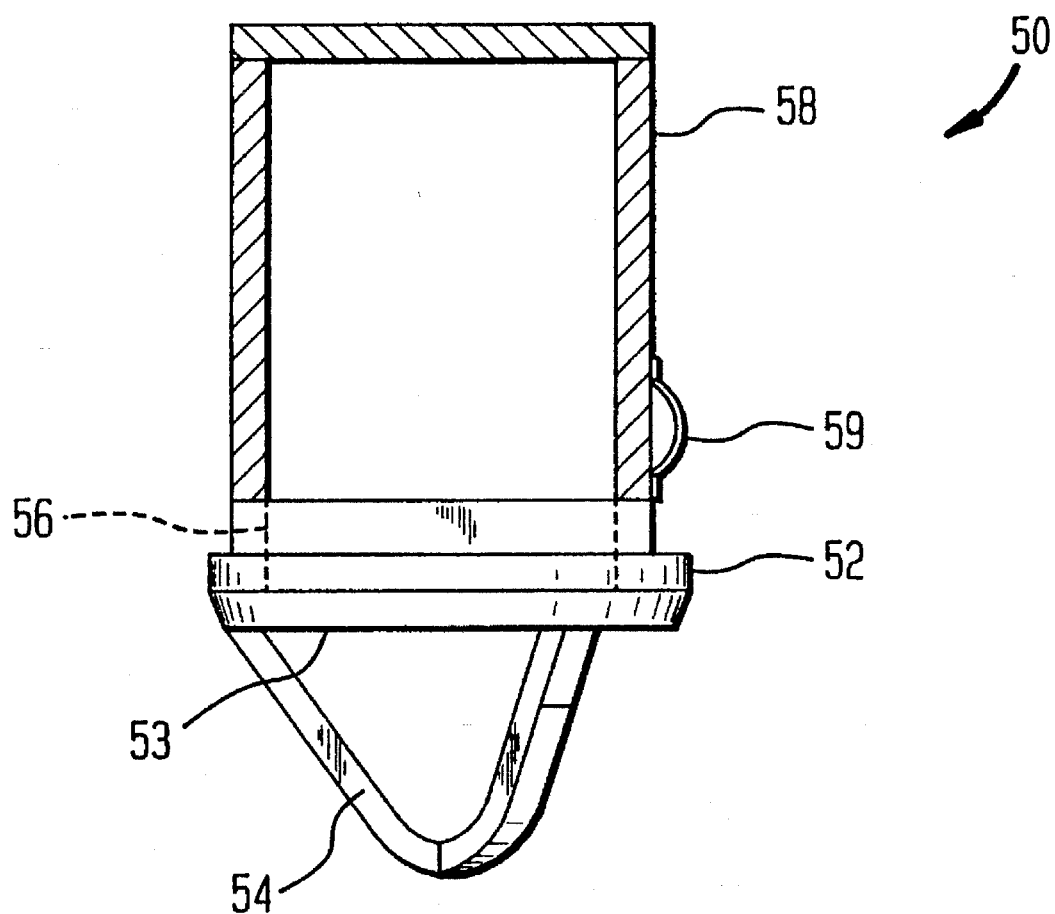
FIG. 5 illustrates a partial cross-sectional view of a debris filter in accordance with the invention for insertion in the fuel assembly of FIGS. 4A and 4B.

Referring to FIG. 5, a debris filter 50 to be inserted through the orifice 17 and into the open space 18 (FIG. 4A) within the fuel assembly inlet and attached to the inlet nozzle 15' is shown. Debris filter 50 includes debris filter cap ring 52 which forms coolant entrance orifice 53. Extending from filter cap ring 52 is filter replacement three pronged guide 54. In the embodiment shown in FIG. 5, filter replacement three pronged guide 54 is the same configuration, size and geometry as the removed three pronged guide 19. In alternative embodiments, either the replacement three pronged guide can be eliminated or its configuration, size or geometry changed if so desired. Connected to filter cap ring 52 is debris filter support ring 56 to which the filter media 58 is secured. Filter media 58 can be fabricated in a variety of shapes including for example cylindrical and fluted (FIGS. 6A, B, C) and can be made of perforated sheet metal, wire mesh, coarse screen, louvered blades. Examples of louvered blade filter media include angled blades (FIG. 7A), straight blades (FIG. 7B), chevron blades (FIG. 7C), and curved blades (FIG. 7D).

Figure 8:
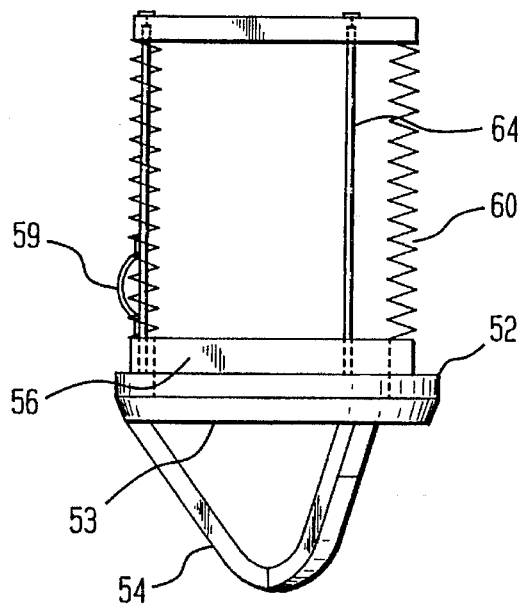
FIG. 8 illustrates a cross-sectional view of a debris filter formed from an assembly of louvered blades.
Figure 9A:
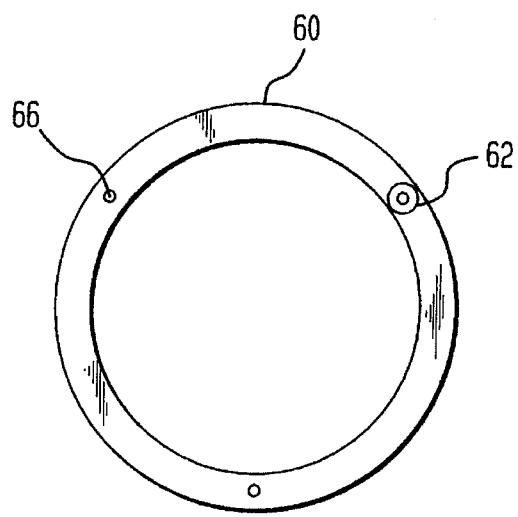
FIG. 9A illustrates a top view of a louvered blade employed in the debris filter shown in FIG. 8.
Figure 9B:
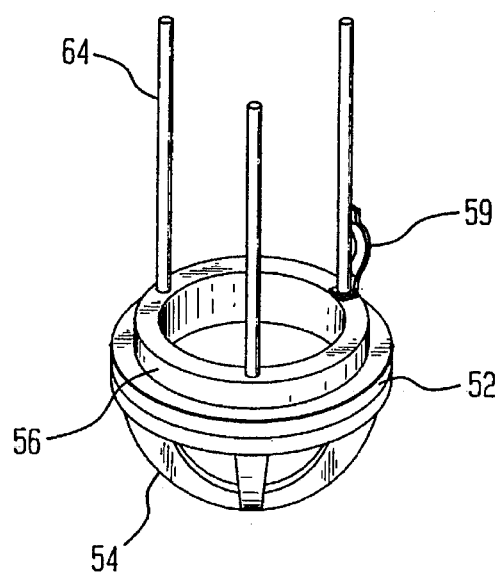
FIG. 9B illustrates a perspective view of the debris filter shown in FIG. 8 before assembly of the louvers to form a rigid structure.

Referring to FIG. 9A, filter media 58 comprises an assembly of louver blade disks 60 and spacer washers 62 stacked on guide rods 64 which are attached to filter support ring 56 (FIG. 9B) and welded to form a rigid structure as shown in FIG. 8.

Figure 10:
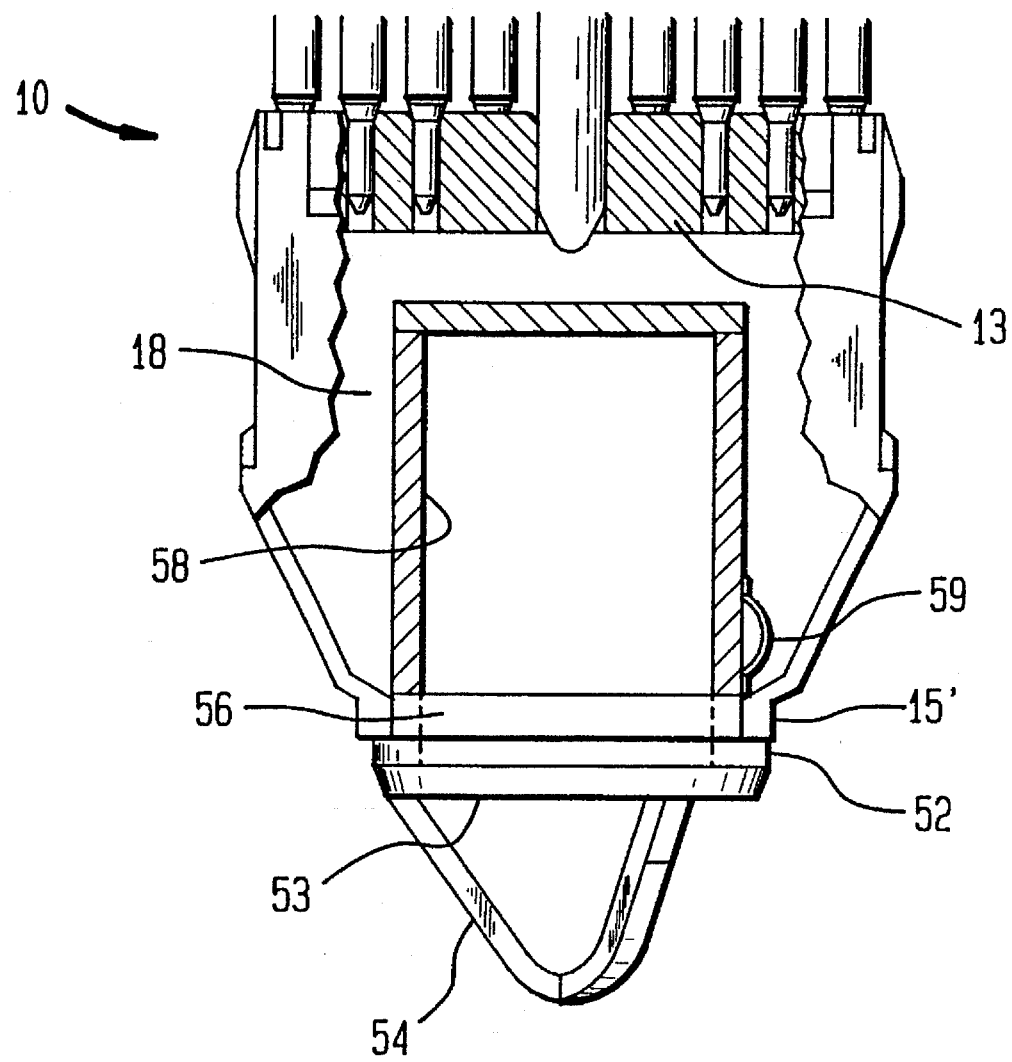
FIG. 10 illustrates an enlarged view of the lower portion of the fuel assembly after the removal of a portion of the lower nozzle and three pronged guide showing the debris filter inserted and positioned within the open region of the lower tie plate.

Referring to FIG. 10, fuel assembly 10 with a portion of the lower nozzle and three pronged guide removed (15') is shown with debris filter positioned within the inlet region of the fuel assembly. Filter cap ring 52 is flush against modified inlet nozzle 15'. Debris filter 50 is positioned and aligned within the fuel assembly by debris filter support ring 56 which sits within modified inlet nozzle 15' and by filter cap ring 52 which sits against the outer lip 16' of modified inlet nozzle 15'. Since coolant flow is from the bottom into the fuel assembly, the direction of coolant flow will bias the debris filter against the modified inlet nozzle. To maintain the debris filter to the assembly during refueling or handling and movement of the fuel assembly, springs 59 which are connected at one end at debris filter support ring 56 (FIGS. 5, 8, 9B and 10) secure the debris filter in place within the modified nozzle 15'. Preferably, springs 59 are made of Inconel or other material of suitable mechanical strength and resilience. Alternatively, other mechanical securing devices can be employed. If the debris filter is not intended to be removed from the fuel assembly at some later date, it can be welded to the modified inlet nozzle.

The external dimensions of the fuel assembly with debris filter 50 installed are unchanged from that of the fuel assembly before being modified. The portion of the debris filter which extends beyond the modified nozzle 15' (i.e. filter ring cap 52 and three pronged guide 54) is substantially the same size as the portion of the nozzle removed by cutting along line Z—Z. Thus, modifications to the reactor core, core support plate, spent fuel storage racks, fuel elevators and other fuel assembly handling and storage apparatus or operating and refueling procedures are not necessary. Furthermore, since the debris filters are removable and reusable, periodic inspection, removal of debris, and interchange from one assembly to another is thereby permitted.

In yet further alternative embodiments, debris filter 50 includes the addition of loosely packed metallic ribbons or coils (not shown) in the interior of the filter media 58 to further trap and retain debris which would become entangled by the metallic ribbons.

The efficiency of debris filter 50 can be increased by altering the filter area of filter media 58. For example, a cylindrical design filter (FIG. 5) can provide substantially greater filter area (which is limited only by the internal dimensions of the inlet nozzle) compared to the area of the orifice 17 in inlet nozzle 15. The filter shown in FIG. 5 has a filter area of approximately 45 $in^2$ as compared to the cross-sectional area of orifice 17 which is approximately 7 $in^2$. Thus, a very high efficiency can be employed by increasing the surface area of the filter media 58 without incurring an excessively high pressure drop.

The pressure drop of debris filter 50 can be designed to be a predetermined value by varying design variables such as thickness, spacing, angle, and type of filter blades. The ability to select and thereby vary the pressure drop across the inlet nozzle of the fuel assembly as a result of utilizing the debris filter provides the ability to adjust the flow rate to selected assemblies in a given core. Accordingly, the ability to select a pressure drop and adjust the flow rate to selected assemblies is particularly useful in adjusting the hydraulic stability of a core which contains two or more nuclear fuel designs which have different intrinsic pressure drops (flow coefficients).

While the foregoing description and drawings represent the preferred embodiments of the present invention, it will be apparent to those skilled in the art that various changes and modifications may be made therein without departing from the true spirit and scope of the present invention.

I claim:

1. A method for retrofitting an irradiated nuclear fuel assembly in bottom entry fuel assembly type nuclear reactors, the fuel assembly having an inlet nozzle comprising a fuel assembly inlet with an orifice and a multi-pronged guide, said method comprising the steps of:

(a) first removing at least a portion of the multi-pronged guide of the fuel assembly inlet nozzle;

(b) installing a debris filter within the fuel assembly inlet through the inlet orifice;

wherein the debris filter has an outer portion extending beyond the inlet nozzle of the fuel assembly, the outer portion comprising a debris filter multi-pronged guide having substantially the same configuration as the removed portion of the multi-pronged guide; and wherein the insert further includes springs to secure the debris filter within the fuel assembly inlet.

2. The method of claim 1 wherein the outer portion of the debris filter is substantially the same dimension as the removed portion of the multi-pronged guide so that the external dimension of the retrofitted fuel assembly with the debris filter is the same as that of the fuel assembly before being retrofitted with the debris filter.

3. The method of claim 4 wherein the debris filter has a filter area larger than the cross-sectional area of the orifice.

* * * * *